United States Patent [19]

Doutsbo

[11] Patent Number: 4,682,247
[45] Date of Patent: Jul. 21, 1987

[54] TAPE SPEED DETERMINING APPARATUS FOR VIDEO SIGNAL REPRODUCING APPARATUS

[75] Inventor: Nobuhide Doutsubo, Daito, Japan

[73] Assignee: Sanyo Electric Co., Ltd., Osaka, Japan

[21] Appl. No.: 713,067

[22] Filed: Mar. 18, 1985

[30] Foreign Application Priority Data

Mar. 19, 1984 [JP] Japan .................... 59-52720

[51] Int. Cl.$^4$ ............... H04N 5/783; G11B 15/46
[52] U.S. Cl. .................... 360/10.2; 360/73; 360/10.3
[58] Field of Search ........... 360/73, 77, 10.2, 10.3, 360/9, 1, 70

[56] References Cited

U.S. PATENT DOCUMENTS

| | | | |
|---|---|---|---|
| 4,297,733 | 10/1981 | Sanderson | 360/70 |
| 4,403,260 | 9/1983 | Kawamura | 360/10.2 |
| 4,550,345 | 10/1985 | Terada | 360/73 |
| 4,568,986 | 2/1986 | Furuhata | 360/73 |
| 4,607,298 | 8/1986 | Yomashira | 360/73 |

FOREIGN PATENT DOCUMENTS

| | | |
|---|---|---|
| 58-98859 | 6/1983 | Japan . |
| 58-98860 | 6/1983 | Japan . |
| 58-130459 | 8/1983 | Japan . |

OTHER PUBLICATIONS

Nobuyoshi Yokobori et al., National Technical Report, vol. 28, No. 3, Jun. 1, 1982 (Japan) Translation.

Primary Examiner—Alan Faber
Attorney, Agent, or Firm—Armstrong, Nikaido, Marmelstein & Kubovcik

[57] ABSTRACT

A tape speed determining apparatus applied to a video signal reproducing apparatus employing a helical scanning system, a rotating head system and a pilot signal system serves to determine automatically the recording mode of a video tape to be reproduced, in case where two kinds of recording modes, i.e. a standard recording mode and a long recording mode, are applicable and the speed of a video tape differs dependently on the respective recording modes. The tape speed determining apparatus delays by an infinitesimal time "t" the timing for selection of the reference signals $f_1$ and $f_3$ out of the reference signal $f_1$ to $f_4$ supplied at the time of reproduction, as compared with the reproducing head selection timing. An error signal generated during this delayed time "t" is sampled and held for a frame period. A wavelength of a fundamental wave of the sampling output is determined by counting the number of capstan rotation detecting pulses, and thus the recording mode of the video tape is determined as a function of the count value.

7 Claims, 11 Drawing Figures

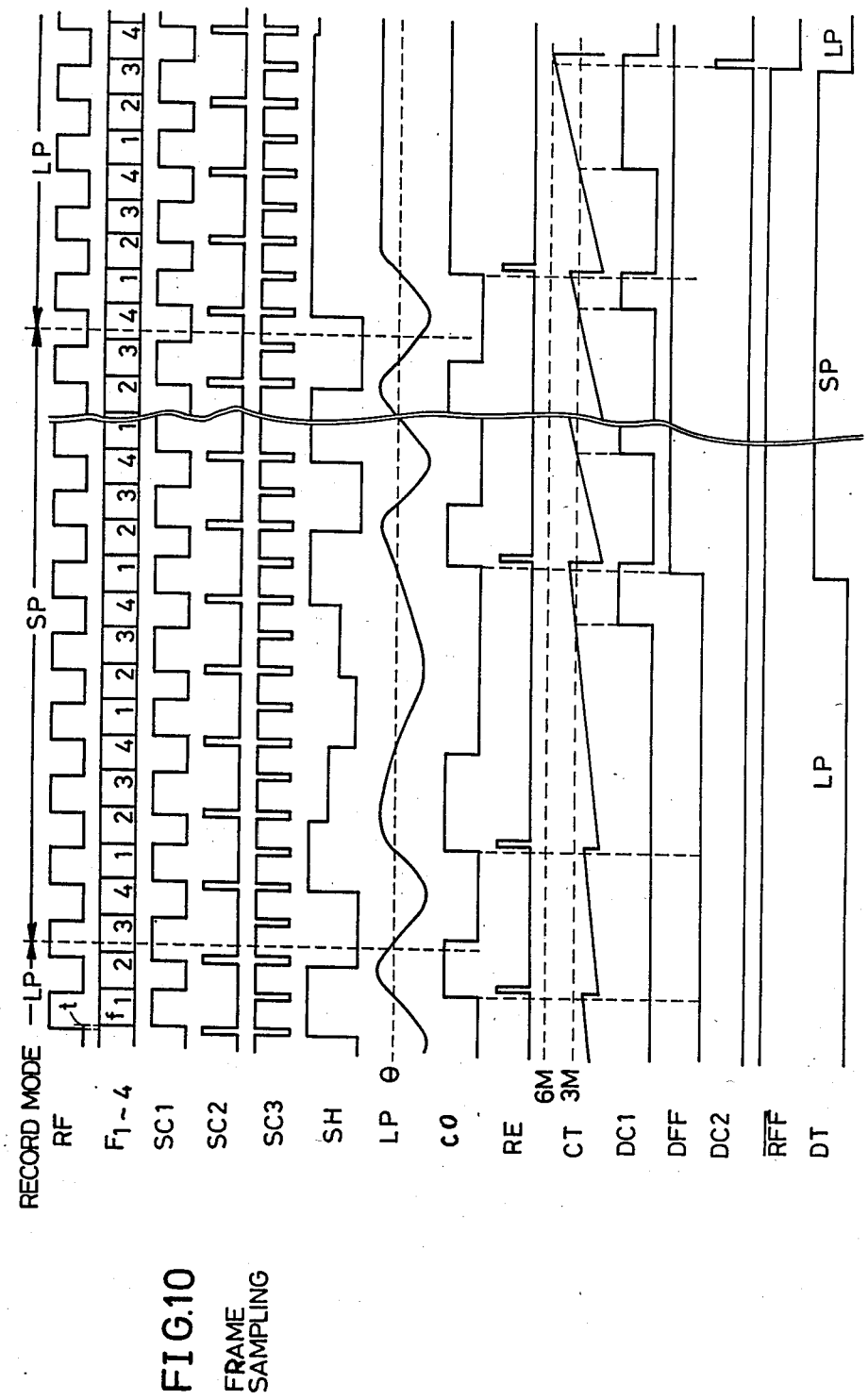
FIG.10 FRAME SAMPLING

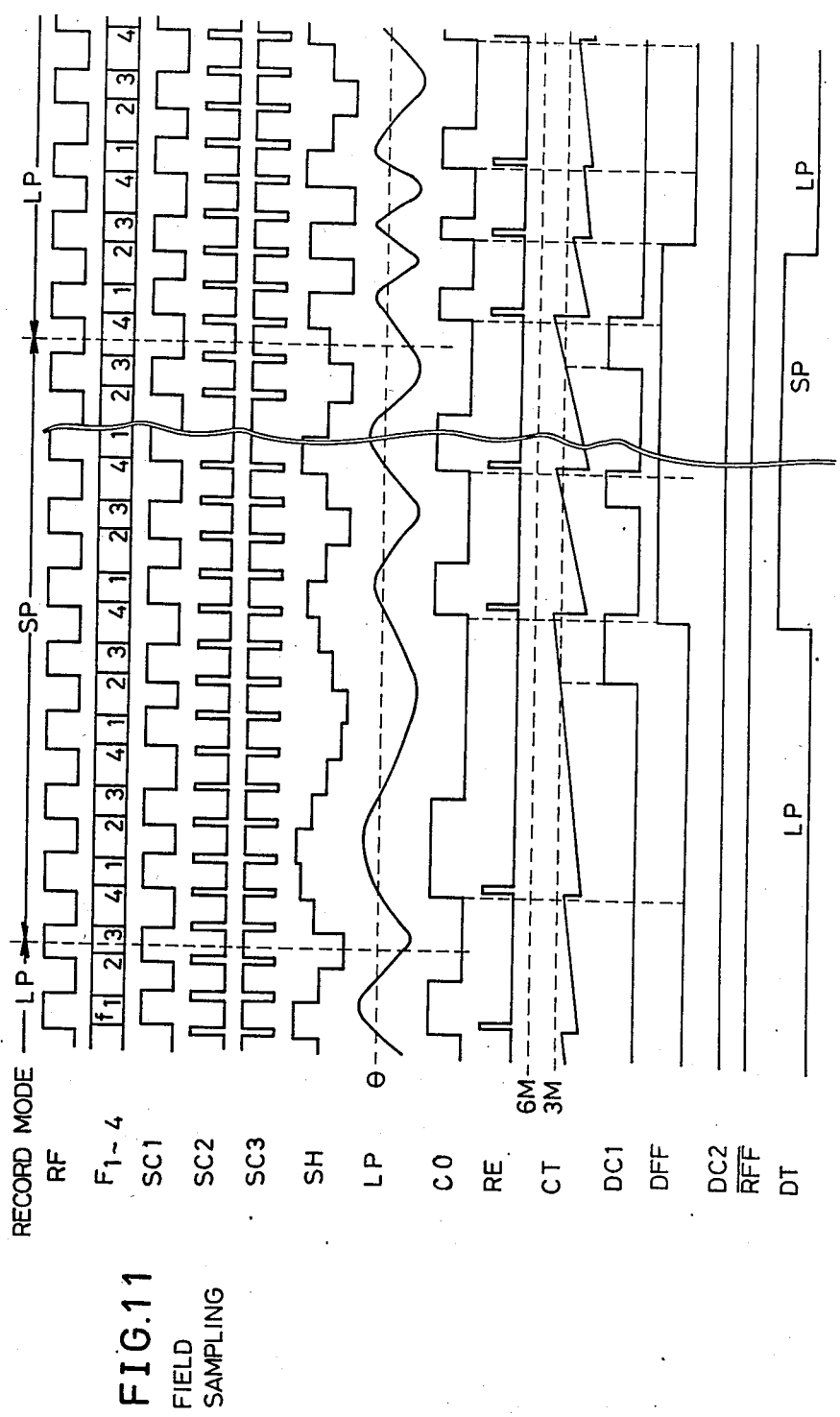

TAPE SPEED DETERMINING APPARATUS FOR VIDEO SIGNAL REPRODUCING APPARATUS

BACKGROUND OF THE INVENTION

1. Field of the Invention

The present invention relates to a tape speed determining apparatus in a reproducing apparatus for reproducing a video signal recorded in a recording medium such as a magnetic tape or the like. Particularly, the present invention relates to a tape speed determining apparatus for automatically determining the recording mode selected from a plurality of recording modes on which the speed of a magnetic tape depends, whereby an appropriate reproducing tape speed can be selected. More particularly, the present invention relates to an improvement of a tape speed determining circuit in a reproducing apparatus of a helical scanning system and a rotating head system, using a so-called pilot signal system for reproducing a signal recorded on a magnetic tape where tracking pilot signals are recorded in an overlapping manner with a video signal without any tracks for recording a tracking control signal.

2. Description of the Prior Art

A tracking control method using a so-called pilot signal system is proposed in the U.S. Pat. No. 4,297,733.

As an example of a video signal reproducing apparatus in which such a tracking control method of the pilot signal system is adopted, a small-sized magnetic recording and reproducing apparatus called an "8mm VTR" has attracted special interest recently. In such a small-sized magnetic recording and reproducing apparatus, a video tape can be recorded and reproduced with standardized two kinds of tape speed, namely, the standard play speed and the long play speed which is decreased to half of standard play speed for recording for a longer period of time. Accordingly, at the time of reproduction, it is necessary to determine at which tape speed the video signal has been recorded so that the video signal may be reproduced at a tape speed equal to the thus determined tape speed.

In a magnetic recording and reproducing apparatus of the VHS system or the Beta system currently placed on the market, a control-track for speed control is provided on a video tape and based on a reproduced control signal detected from this control-track, an appropriate tape speed can be determined, and thus, a tape speed for reproduction can be automatically selected.

On the other hand, in the 8 mm VTR as described above where tracking control of the pilot signal system is applied, no control-track for speed control exists on a video tape to be used. Consequently, in order to automatically determine an appropriate tape speed for reproduction, it is necessary to provide a determining circuit not depending on the reproduced control signal from the control-track.

Such speed determining circuits as used in the prior art are shown for example in Japanese Patent Application Laying-Open Gazette No. 98859/1983, Japanese Patent Application Laying-Open Gazette No. 98860/1983, and Japanese Patent Application Laying-Open Gazette No. 130459/1983, etc. However, any one of the above mentioned prior art only discloses a video tape speed determining circuit in the normal form of reproduction and involves a disadvantage that such a determining circuit cannot be utilized for special forms of reproduction other than the normal form of reproduction.

Under these circumstances, the inventor of the present application proposed in the copending U.S. patent application Ser. No. 697,100 filed on Feb. 1, 1985 by the inventor of the present application, a reproducing apparatus in which an appropriate speed consistent with the recording mode can be automatically selected for reproduction of the tape by determining even in special reproduction, in what mode the video signal to be reproduced has been recorded in the magnetic tape. In this proposed reproducing apparatus, when a discontinuously recorded track is scanned for each one field by a helical scanning system, a specified reference signal is mixed in synchronism with the scanning of the central portion of the recorded track by a head so that an error output formed by pilot signals reproduced from the central portion of the track and the mixed reference signal is subjected to sample-and-hold operation. Then, a changing cycle of the output obtained by the sample-and-hold operation is counted by a frequency divided output of the capstan motor rotation detecting output and based on the count value, the recording mode can be determined.

However, in the above described copending U.S. patent application Ser. No. 697,100 entitled "Apparatus for Reproducing Magnetically Recorded Video Signal", filed Feb. 1, 1985 by the inventor of the present application, a disadvantage is involved that the circuit structure is complicated since a specified reference signal needs to be selected temporarily from the reference signals successively provided with a field period for tracking control in synchronism with the timing of sample-and-hold operation applied to an error output which is formed based on the specified reference signal and pilot signal reproduced from the central portion of a signal track at a stable output level.

SUMMARY OF THE INVENTION

The present invention makes, it possible to overcome all of such disadvantages of the apparatus described above and aims to provide a tape speed determining circuit of a relatively simple structure for video signal reproducing apparatus, in which the most appropriate tape speed for reproduction can be automatically selected to provide a reproduced signal with little noise in any case of normal and special forms of reproduction.

As is different from the previously described copending U.S. patent application filed by the inventor of the present application on Feb. 1, 1985, in which a specified reference signal is selected from the successively provided reference signals according to the timing with which a reproducing head scans the central portion of a recorded track, the present invention delays by an infinitesimal time "t" i.e. a very short period of time, substantially shorter than a field period, the timing for selection of specified reference signals from a plurality of kinds, for example, four kinds of reference signals cyclically supplied. During the delayed time, an error signal is generated by a pilot signal reproduced in this time and a reference signal supplied since these signals have difference frequencies. Then, the error signal is sampled, and based on a cycle of a fundamental wave component of the sampling output, the recording mode of a signal recorded in the video tape is determined.

It has been determined that if a reference signal having a different frequency from that of a reference signal for tracking is supplied in a time "t" sufficiently shorter than a field period after the start of the scanning of a recorded track by a reproducing head or sufficiently shorter than a field period immediately before the end of the scanning, such supply of a reference signal of different frequency does not affect tracking control of the whole recorded track since the time "t" is a very short period close to the start or the end of the scanning of the recorded track. The present invention is made on the basis of this principle.

Briefly stated, the present invention comprises: delay means for delaying by an infinitesimal time sufficiently shorter than one field, the timing for selecting specified reference signals from the reference signals selected and supplied at a predetermined timing; detecting means for detecting a cycle of an error signal obtained by mixing reference signals supplied during the time delayed by the delay means and pilot signals reproduced during this delayed time; and determining means for determining based on the output of the detecting means, the recording mode of a video signal recorded in a video tape.

Accordingly, the present invention has such simple structure as described above in which a delay by an infinitesimal time is applied only to the selection of the specified reference signals out of the reference signals normally selected and supplied at a predetermined timing, whereby the recording mode of a video tape can be determined and an appropriate tape speed for reproduction consistent with the recording mode can be selected. More specifically, with the above described simple structure, it can be automatically determined not only at the time of normal reproduction but also at the time of special reproduction such as fast forward reproduction, rewinding reproduction, slow reproduction and the like, whether the video tape to be reproduced is a tape having a video signal recorded in the standard play recording mode or a tape having a video signal recorded in the long play recording mode. Thus, the tape speed for reproduction can be appropriately selected to conform to the recording mode.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a timing chart for explaining the operation of the whole circuit shown in FIG. 5 for sampling an error signal for frame period; and FIG. 11 is a timing chart for explaining the operation of the whole circuit shown in FIG. 5 for sampling an error signal for a field period.

DESCRIPTION OF THE PREFERRED EMBODIMENTS

Figure 1:
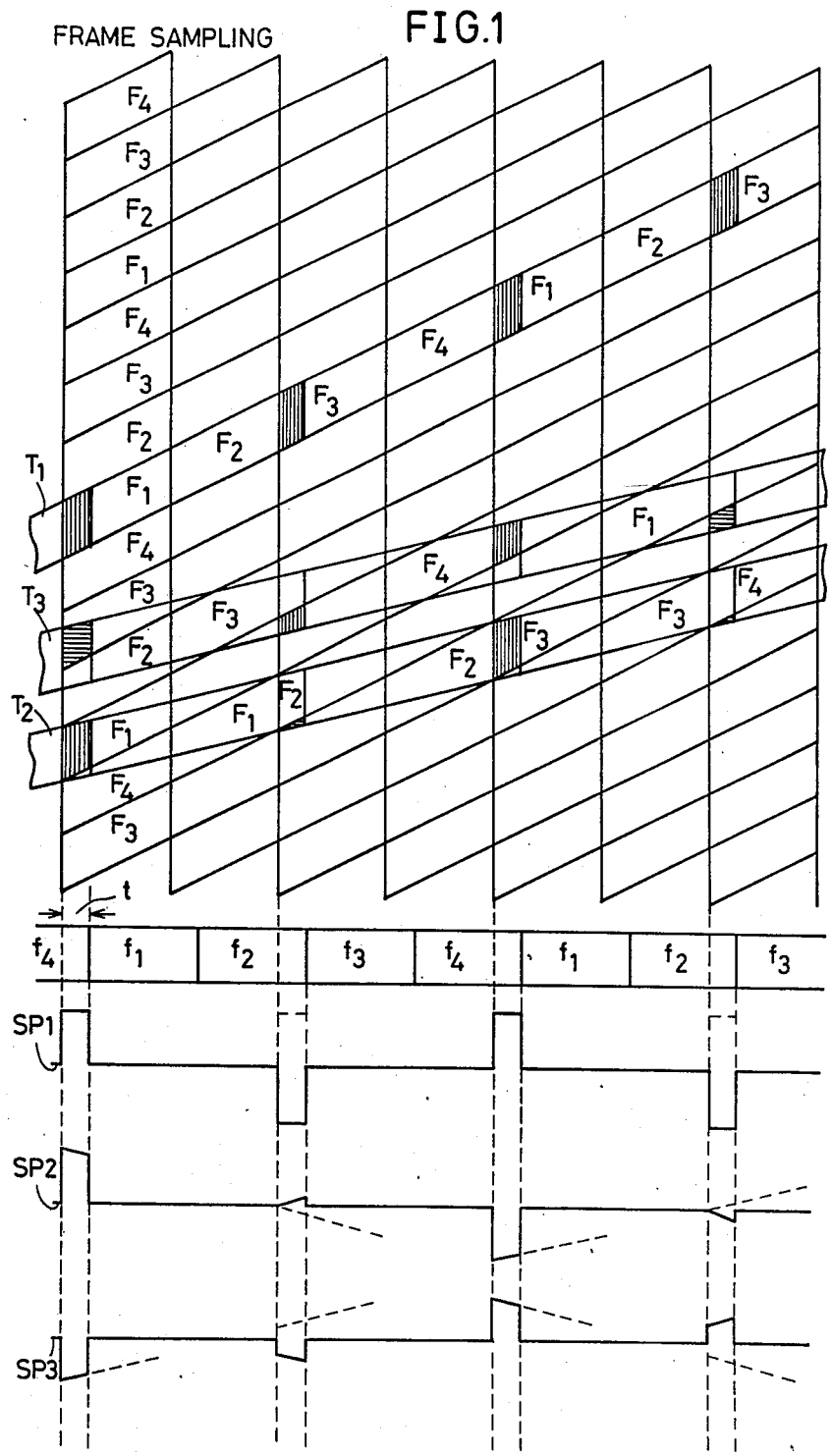
FIG. 1 is a diagram showing scanning loci of reproducing heads as well as changes in the output level attained by sampling for a frame period an error signal provided based on reference signals selected and supplied with a delay according to the principle of the present invention, at the time of reproduction at the standard play speed and at the long play speed on the track patterns of a video tape where a video signal is recorded in the standard play recording mode.

An embodiment of the present invention will be described in the following, by taking an example of a so-called 8 mm video tape recorder (hereinafter referred to as "8 mm VTR").

An 8 mm VTR is a video tape recorder in which a width of a magnetic tape for recording a video signal is 8 mm and a cassette having nearly the same size as that of an audio compact cassette is used. The name 8 mm VTR comes from the expression commonly used by mass media as signifying a video tape recorder comparable with a 8 mm movie projector.

In the 8 mm VTR, four kinds of tracking pilot signals $F_1$, $F_2$, $F_3$ and $F_4$ having different frequencies are applied for tracking control. The pilot signals $F_1$ to $F_4$ are selected cyclically by a field period and are recorded in an overlapping manner on video tracks and PCM tracks. As for the frequencies of the tracking pilot signals, the frequency of the first signal $F_1$ is 102.544 kHz, that of the second signal $F_2$ is 118.951 kHz, that of the third signal is 165.210 kHz, and that the fourth signal $F_4$ is 148.689 kHz. The pilot signals are recorded in order on video tracks in a manner in which a difference between the frequency of a pilot signal on a track and that of a pilot signal on one adjacent track is approximately 16 kHz and a difference between the frequency of the above mentioned signal on that track and that of a pilot signal on the other adjacent track is approximately 46 kHz.

Tracking control at the time of reproduction is performed in the below described manner. When a reproducing head scans a recorded track of a video tape, a side-read effect of the reproducing head is caused and, as a result, the pilot signals recorded on the adjacent tracks on both sides of the scanned track are also read to some extent. This is because the pilot signals have such low frequencies as to receive the side-read effect in spite of the azimuth recording. For example, assuming that the pilot signal $F_1$ is recorded on the track being scanned, the pilot signals $F_4$ and $F_2$ recorded on the adjacent tracks on both sides are also read out besides the pilot signal $F_1$. Therefore, a reference signal $f_1$ having frequency equal to that of the tracking pilot signal $F_1$ on the scanned track is added to the read out pilot signals. As a result, an error signal is generated by the crosstalk components $F_4$ and $F_2$ from the adjacent tracks and the reference signal $f_1$. The error signal is taken out and comparison is made between the level of a component of 46 kHz of the error signal and the level of a component of 16 kHz thereof, whereby a tracking error can be detected. More specifically, since the output levels of the pilot signals $F_4$ and $F_2$ read out from both of the adjacent tracks are equal if tracking by the reproducing head is correct, the levels of the error signal of 46 kHz and 16 kHz generated by mixing of the reference signal $f_1$ are equal to each other. On the other hand, if the reproducing head deviates toward either of the adjacent tracks, the levels of the error signal are not equal. As a result, a tracking error can be detected.

Now, the principle for tape speed determination in the present invention will be described in the following.

Figure 2:
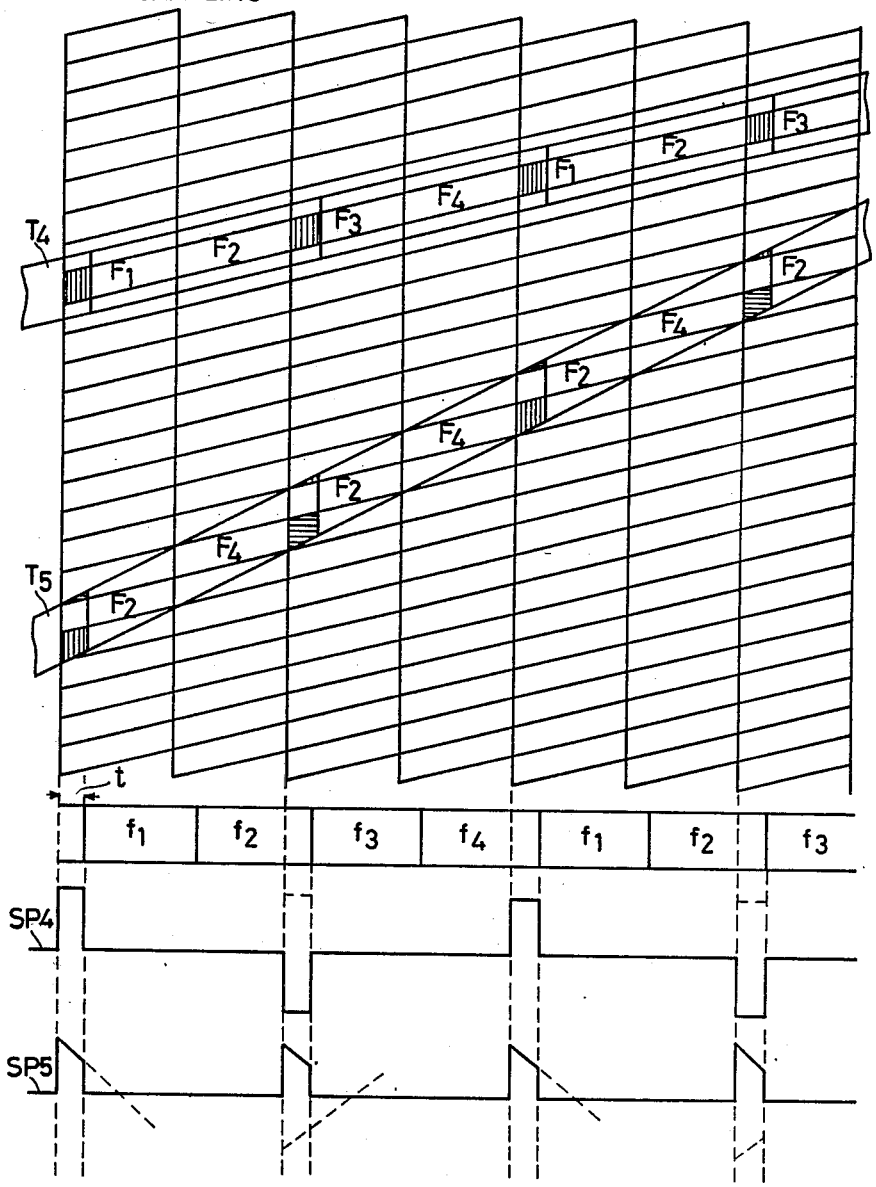
FIG. 2 is a diagram showing scanning loci of reproducing heads as well as changes in the output level attained by sampling for a frame period an error signal provided based on reference signals selected and supplied with a delay according to the principle of the present invention, at the time of reproduction at the long play speed and at the standard play speed on the track patterns of a video tape where a video signal is recorded in the long play recording mode.

FIG. 1 is a diagram showing scanning loci of reproducing heads as well as changes in the output level attained by sampling for a frame period an error signal provided based on reference signals selected and supplied with a delay according to the principle of the present invention, at the time of reproduction at the standard play speed and at the long play speed on track patterns of a video tape where a video signal is recorded in the standard play recording mode. FIG. 2 is a diagram showing scanning loci of reproducing heads as well as changes in the output level attained by sampling for a frame period an error signal provided based on reference signals selected and supplied with a delay according to the principle of the present invention, at the time of reproduction at the long play speed and at the standard play speed on track patterns of a video tape where a video signal is recorded in the long play recording mode. In FIGS. 1 and 2, the track patterns of a video tape are represented as track patterns of a video tape in a helical scanning system, according to a method different from a conventionally utilized method. The method for representing track patterns shown in FIGS. 1 and 2 is called "the track pattern coordinate method", which was proposed by Nobuyoshi Yokobori et al. in "National Technical Report Vol. 28 No. 3 June 1, 1982".

In this track pattern coordinate method, a tape is represented by vertical lines and tapes running vertically are aligned adjacent to each other in the horizontal direction. Track patterns represented as being slanted upward to the right on the tape are moved by one track pitch each time the tape moves from the left to the right. Accordingly, in this coordinate system, track patterns and heads scanning loci can be recognized as a continuous line locus. Furthermore, since the abscissa represents time and the ordinate represents an amount of movement on the tape, the time, the amount of movement of the heads on the tape and other data can be read at once.

Referring to FIG. 1, a scanning locus of reproducing heads at the time of reproduction at the standard play speed on the track patterns of a video tape with a video signal recorded in the standard recording mode is $T_1$. A delay is applied by an infinitesimal time "t" as a whole to the timing for selection of the reference signals to be supplied cyclically for a field period to the pilot signals reproduced according to the above mentioned scanning locus $T_1$. More specifically, although the reference signals are usually selected with the same timing as for selection of reproducing heads, the timing for selection of the reference signals in this embodiment of the present invention is delayed by the infinitesimal time "t" as compared with the timing for selection of heads, so that an error signal may be generated in the infinitesimal period after the start of scanning of the respective tracks. Then, the output of an error signal generated at the infinitesimal period of the start of scanning of the tracks is sampled for a frame period and, as a result, a sampling output $SP_1$ is obtained. More specifically, when the reproducing heads take the scanning locus $T_1$, the timing for selection of the reference signals is delayed by the infinitesimal time "t" compared with head selection timing as described above and it is observed for a frame period that a beat signal of 46 kHz is generated by the pilot signals reproduced from the vertical hatched regions of the scanning locus $T_1$ and the reference signals supplied. Then, sampling is applied to the error signal by inverting the polarity of a comparing signal for each frame and as a result, an output waveform as shown by $SP_1$ is obtained. In other words, a sampling output $SP_1$ having four fields as a cycle of a fundamental wave component is obtained.

In the same manner, a scanning locus of reproducing heads is $T_2$ or $T_3$ when scanning at the time of reproduction at the long play speed on the track patterns of a video tape with a video signal recorded in the standard play recording mode. In the case of the scanning locus $T_2$ or $T_3$, in the same manner as described above, the timing for selection of the reference signals is delayed by "t" and the output of an error signal is sampled by inverting the polarity thereof for successive frames and thus a sampling output having a waveform $SP_2$ or $SP_3$ is obtained. In other words, in the case of reproduction at the long play speed on a video tape with a signal recorded in the standard play recording mode, a sampling output having eight fields as a cycle of a fundamental wave component is obtained.

In FIG. 1, $F_1$ to $F_4$ on the track patterns represent four kinds of the pilot signals recorded on the tracks and $f_1$ to $f_4$ represent four kinds of the reference signals for feeding.

Referring to FIG. 2, description will be made of the case of reproduction at the long play speed and at the standard play speed on a video tape where a video signal is recorded in the long play recording mode. In the same manner as in FIG. 1, the timing for selection of the reference signals is delayed by an infinitesimal time "t" compared with the head selection timing and sampling is applied for a frame period to an error signal obtained by the pilot signals reproduced in the delayed time and the reference signals supplied by inverting the polarity of the comparing signal in successive frames, so that a sampling output having characteristics as described below is obtained.

The scanning locus of reproducing heads is $T_4$ at the time of reproduction at the long play speed on the track patterns recorded in the long play recording mode and sampling output $SP_4$ obtained at this time has four fields as a cycle of a fundamental wave component.

The scanning locus of reproducing heads is $T_5$ at the time of reproduction at the standard play speed on the track patterns recorded in the long play recording mode and a sampling output $SP_5$ obtained at this time has infinity as a cycle of a fundamental wave component.

From the above description with reference to FIGS. 1 and 2, it is made clear that in the case of reproduction of a video tape with a video signal recorded in the standard play recording mode, there is a fixed relation between a cycle of the fundamental wave component of the sampling output and a moving amount of the video tape irrespective of the tape speed for reproduction, namely, if the tape speed for reproduction is either the standard play speed or the long play speed.

More specifically stated, the number of rotation detecting pulses generated from a capstan rotating for moving the tape at a prescribed speed is for example 360 per second in the standard play speed. Accordingly, six rotation detecting pulses are generated for one field (1/60 sec.). On the other hand, if a video tape with a signal recorded in the standard play recording mode is reproduced at the standard play speed, the cycle of the fundamental wave component of the sampling output is four fields. Accordingly, for one wavelength of this fundamental wave, the number of rotation detecting pulses generated is 24, which is the product of multiplication of 6 pulses by 4 field.

If the video tape is moved at the long play speed, the number of rotation detecting pulses generated from the capstan is half of the number at the standard play speed, namely, 180 per second. Accordingly, three rotation detecting pulses are generated for one field (1/60 sec.). On the other hand, as described above with reference to FIG. 1, if a video tape with a signal recorded in the standard play recording mode is reproduced at the long play speed, the cycle of the fundamental wave component of the sampling output is 8 fields. As a result, the number of rotation detecting pulses generated for one wavelength of this fundamental wave is 24, which is the product of multiplication of 3 pulses by 8 fields.

In addition, as described above with reference to FIG. 2, if a video tape with a signal recorded in the long play recording mode is reproduced at the long play speed, the number of rotation detecting pulses for one wavelength of the sampling output is 12, as the result of multiplication of 3 pulses by 4 fields, and if the same tape is reproduced at the standard play speed, the number of rotation detecting pulses is infinity as the result of multiplication of 3 pulses by infinity fields. The above described relations are shown in the following Table 1.

TABLE 1

| Tape Speed | | Fundamental Wave | Number of Rotation |
|---|---|---|---|
| REC Mode | REP Mode | Frequency of sampling Output | Detecting pulses for one wavelength |
| SP | SP | 15.0 Hz | 24 |
| SP | LP | 7.5 Hz | 24 |
| LP | LP | 15.0 Hz | 12 |
| LP | SP | 0 | infinity |

REC Mode: Recording Mode
REP Mode: Reproducing Mode
SP: Standard Play Speed
LP: Long Play Speed From the above indicated relations in Table 1, it can be generally said that in the case of reproduction of a video tape with a video signal recorded in the standard play recording mode, the number of rotation detecting pulses detected for one wavelength of the fundamental wave of the sampling output is 4M assuming that the number of rotation detecting pulses generated for one field is M at the standard play speed. This number 4M has no dependency on the tape speed for reproduction. Accordingly, in the standard play state of reproduction, if it can be determined whether the number of rotation detecting pulses for one wavelength of the sampling output is 4M or not, it can be determined whether the video signal recorded in the tape is recorded in the standard play recording mode or not. Then, based on this determination, an appropriate tape speed corresponding to the recording mode can be selected for reproduction.

It was ascertained in the aforementioned copending U.S. Patent application that at the time of reproduction at a higher speed multiplied by an odd number, the cycle of the fundamental wave component of the sampling output becomes the same as that in the normal reproduction. Accordingly, in the reproduction at such an odd-number multiple speed, the above described relations can also be applied if the capstan rotation detecting pulses are frequency divided according to the multiple speed of reproduction.

In addition, with regard to slow motion reproduction, a cycle of a fundamental wave component of a sampling output is: $4 \div (\frac{1}{3}) = 12$ fields for $\frac{1}{3}$ slow motion reproduction and $4 \div (1/5) = 20$ fields for 1/5 slow motion reproduction and, therefore, the above described determination principle can also be applied.

Based on the above described principle, an embodiment of the present invention comprises an apparatus in which assuming that the number of rotation detecting pulses for one field from a capstan for moving a video tape at the standard play speed is M, it is determined that a video signal in the video tape is recorded in the standard play recording mode if the number of rotation detecting pulses counted for one wavelength of a fundamental wave of a sampling output is 4M and that a video signal in the tape is recorded in the long play recording mode if the count number is not equal to 4M. Thus, based on the determination, an appropriate tape speed for reproduction can be selected.

The above described general relations are shown in Table 2.

TABLE 2

| REC | REP | |
|---|---|---|
| | SP | LP |
| SP | 4M | 4M |
| LP | infinity | 2M |

M: Number of rotation detecting pulses provided from capstan for one field at the standard play speed The principle of the present invention is applied not only to the sampling of an error signal for a frame period as described above but also to the sampling of an error signal for a field period.

Figure 3:
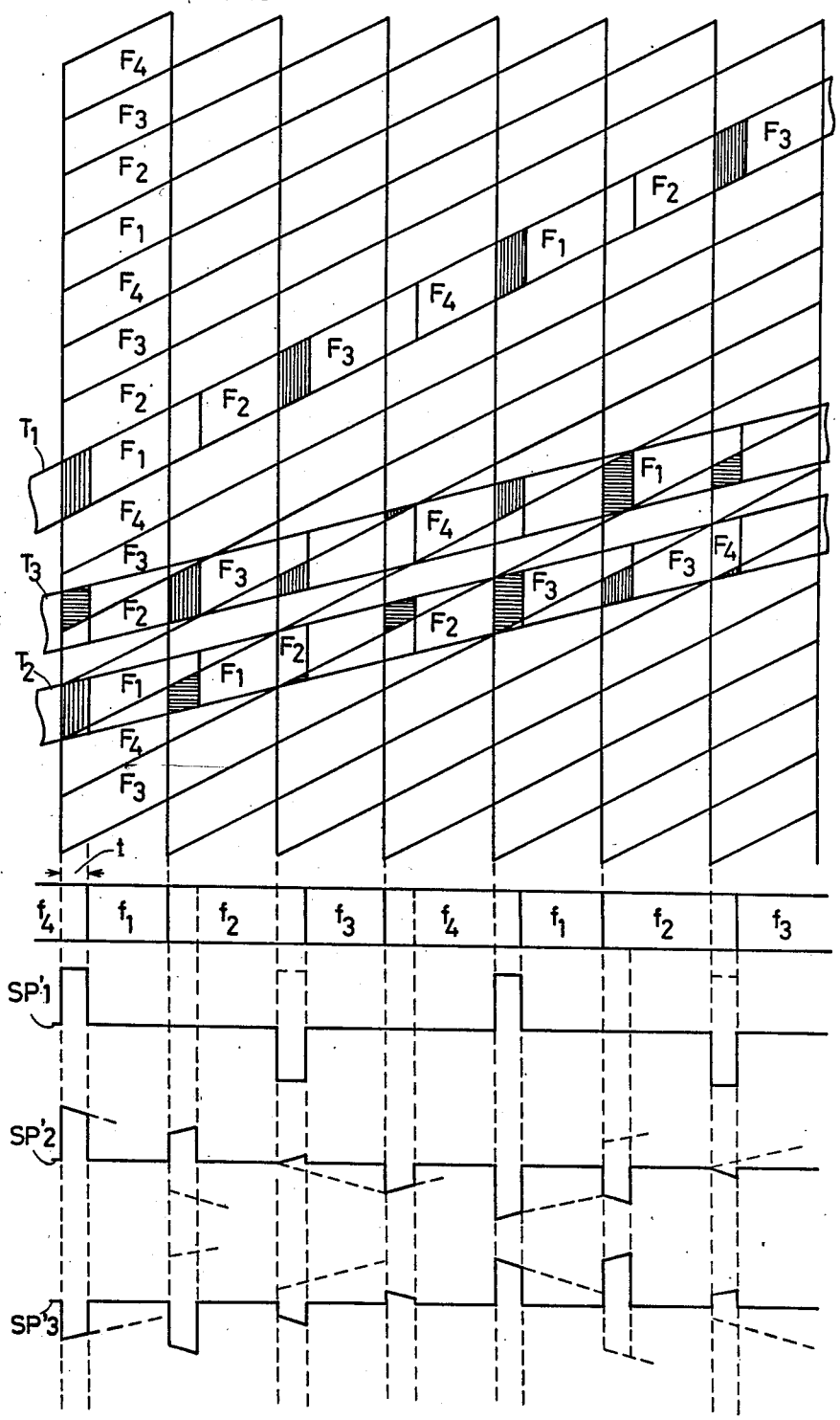
FIG. 3 is a diagram showing scanning loci of reproducing heads as well as changes in the output level attained by sampling for a field period an error signal provided based on reference signals selected and supplied with a delay according to the principle of the present invention, at the time of reproduction at the standard play speed and at the long play speed on the track patterns of a video tape where a video signal is recorded in the standard play recording mode.
Figure 4:
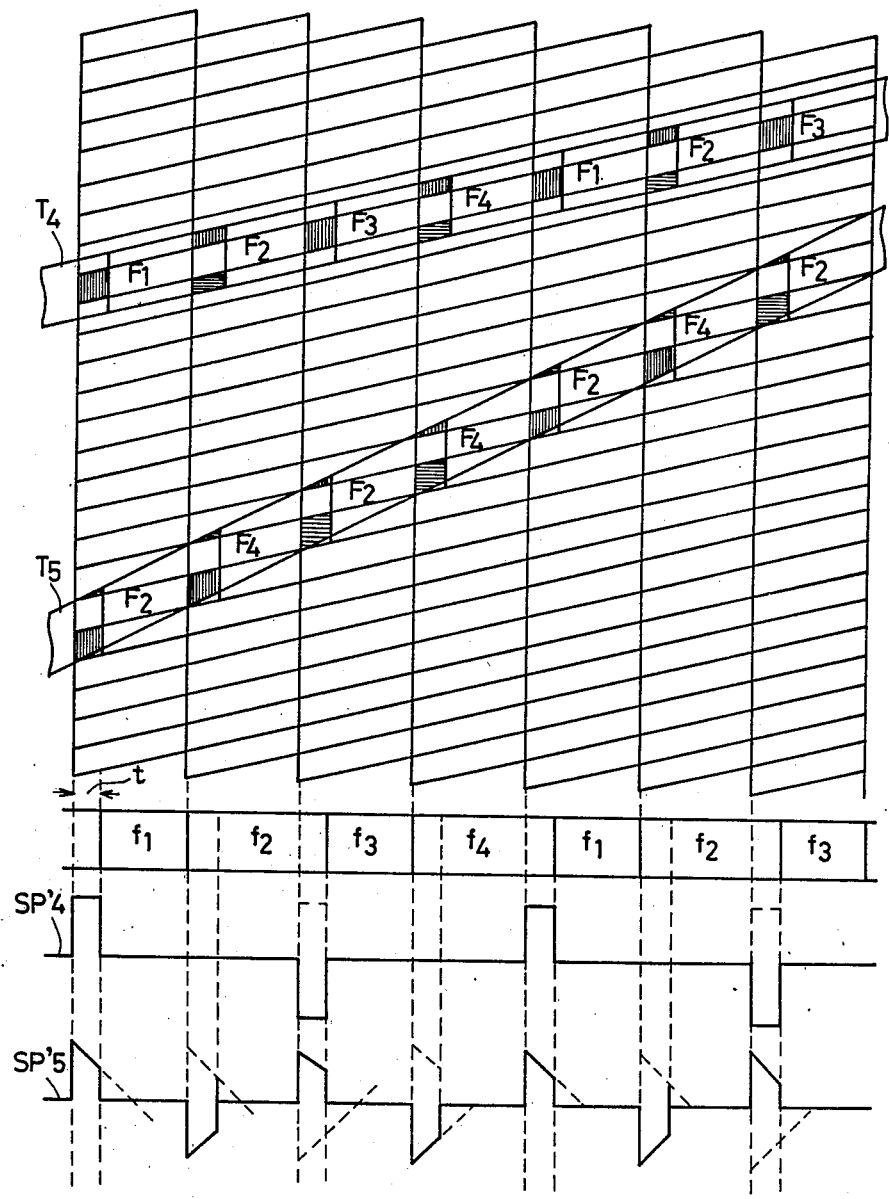
FIG. 4 is a diagram showing scanning loci of reproducing heads as well as changes in the output level attained by sampling for a field period an error signal provided based on a reference signals selected and supplied with a delay according to the principle of the present invention, at the time of reproduction at the long play speed and at the standard play speed on the track patterns of a video tape where a video signal is recorded in the long play recording mode.

FIGS. 3 and 4 are diagrams in which the principle of the present invention is applied to the sampling of an error signal for a field period. More specifically, Fig. 3 is a diagram showing scanning loci of reproducing heads as well as changes in the output level attained by sampling for a field period an error signal provided based on reference signals selected and supplied with a delay according to the principle of the present invention, at the time of reproduction at the standard play speed and at the long play speed on the track patterns of a video tape where a video signal is recorded in the standard play recording mode. FIG. 4 is a diagram showing scanning loci of reproducing heads as well as changes in the output level attained by sampling for a field period an error signal provided based on reference signals selected and supplied with a delay according to the principle of the present invention, at the time of reproduction at the long play speed and at the standard play speed on the track patterns of a video tape where a video signal is recorded in the long play recording mode.

As shown in FIGS. 3 and 4, in the sampling of an error signal for a field period, the timing for selection of the reference signal supplied is not uniformly delayed by a prescribed infinitesimal time "t" for all the four kind reference signals as compared with the head selection timing, but such delay by a prescribed infinitesimal time "t" is applied only to specified reference signals, for example, $f_4$ and $f_2$. Accordingly, the timing for selection of the reference signals is applied in a manner in which a period for supplying the reference signals $f_1$ and $f_3$ is shorter than one field by the infinitesimal time "t" and a period for supplying the reference signals $f_2$ and $f_4$ is longer than one field by the infinitesimal time "t".

As a result, if a video tape with a signal recorded in the standard play recording mode is reproduced at the standard play speed, a cycle of a fundamental wave component of the sampling output $SP'_1$ is four fields and if the same video tape is reproduced at the long play speed, a cycle of a fundamental wave component of the sampling output is eight fields as shown by $SP'_2$ and $SP'_3$. On the other hand, if a video tape with a signal recorded in the long play speed is reproduced at the long play speed, a cycle of a fundamental wave component of the sampling output $SP'_4$ is four fields and if the same video tape is reproduced at the standard play speed, a cycle of a fundamental wave component of the sampling output $SP'_5$ is two fields.

Accordingly, based on the above described relations, a relationship as shown in Table 3 is generally established between the recording speed and the reproducing speed in the same manner as described above with reference to Figs. 1 and 2.

TABLE 3

| REC | REP SP | LP |
|---|---|---|
| SP | 4M | 4M |
| LP | 2M | 2M |

Consequently, also in the sampling of an error signal for a field period, the recording mode of the tape can be determined in the same manner as described above, so that an appropriate tape speed for reproduction can be selected.

If a system for sampling an error signal for a field period is employed, this system can be applied to normal reproduction and slow motion reproduction, but cannot be applied to reproduction at a multiple speed as indicated by the inventors of the present application in the aforesaid copending U.S. patent application.

Although in the sampling of an error signal for a frame period as described previously in connection with FIGS. 1 and 2, the timing for selection of the reference signals $f_1$ to $f_4$ to be supplied is uniformly delayed by the infinitesimal time "t" compared with the head selection timing, the timing of change from the reference signal $f_1$ to reference signal $f_2$ and the timing of change from the reference signal $f_3$ to the reference signal $f_4$ may coincide with the head selection timing in this case. This is because the reference signals $f_1$ and $f_3$ are not utilized for sampling of an error signal and need not be delayed.

Figure 5:
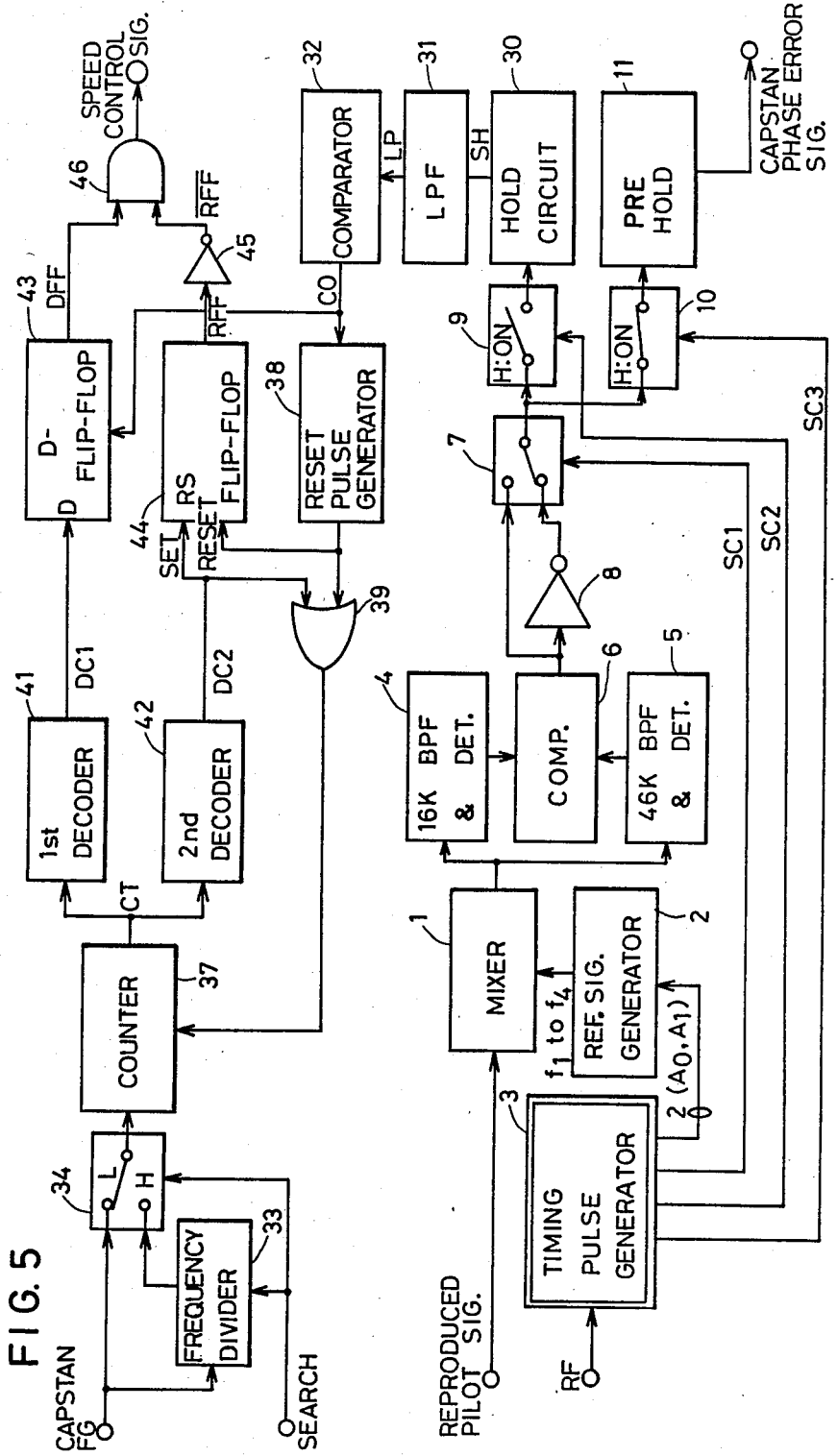
FIG. 5 is a block diagram showing a circuit structure in an embodiment of the present invention.

FIG. 5 is a block diagram showing a circuit structure of an embodiment of the present invention. Referring to FIG. 5, a signal reproduced by reproducing heads is divided into a reproduced video signal and reproduced pilot signals and the reproduced pilot signals are supplied to a mixer 1. To the mixer 1, reference signals $f_1$ to $f_4$ are supplied from a reference signal generator 2. The reference signals provided from the reference signal generator 2 are selected cyclically with prescribed timing based on a 2-bit ($A_0$, $A_1$) control signal supplied from a timing pulse generator 3.

In the mixer 1, the reproduced pilot signals and the reference signals are mixed. The output of mixing is supplied through a 16 kHz bandpass filter and detector 4 and a 46 kHz bandpass filter and detector 5 to a comparator 6, where comparison is performed. An output of the comparator 6 is on one hand supplied directly to one input terminal of a first switch 7 and on the other hand inverted by an inverter 8 to be supplied to the other input terminal of the first switch 7. The first switch 7 is tuned to either side approximately for a field period in response to a selection signal SC1 supplied from the timing pulse generator 3. An output of the first switch 7 is supplied to a second switch 9 and to a third switch 10, respectively, controlled with prescribed timing. The output of the second switch 9 serves as a tape speed determining signal and the output of the third switch 10 serves for servo control of the capstan.

Now, in the following, description will be given concerning a detailed structure of the timing pulse generator 3 for supplying control signals and selection signals to the first switch 7, the second switch 9 and the third switch 10 as well as the signals thus supplied.

Figure 6:
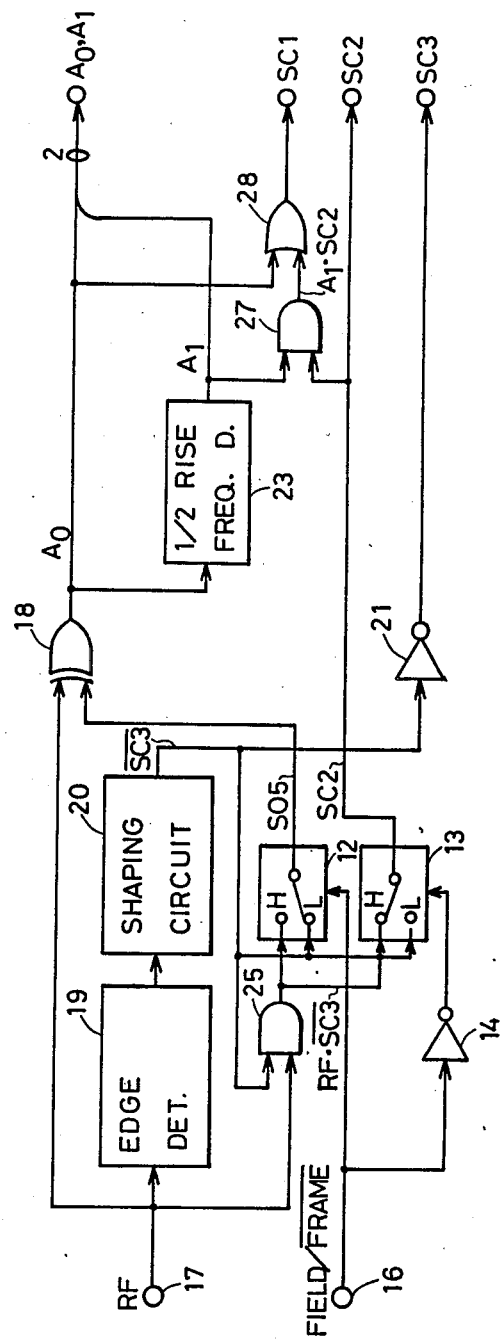
FIG. 6 is a block diagram showing a more detailed structure of a timing pulse generating circuit in FIG. 5.
Figure 7:
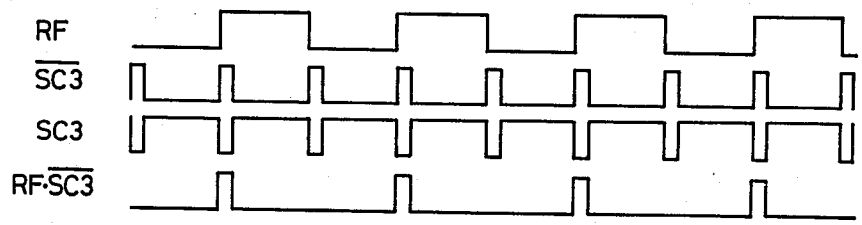
FIG. 7 is a timing chart for explaining the operation of the timing pulse generating circuit shown in FIGS. 5 and 6.
Figure 8:
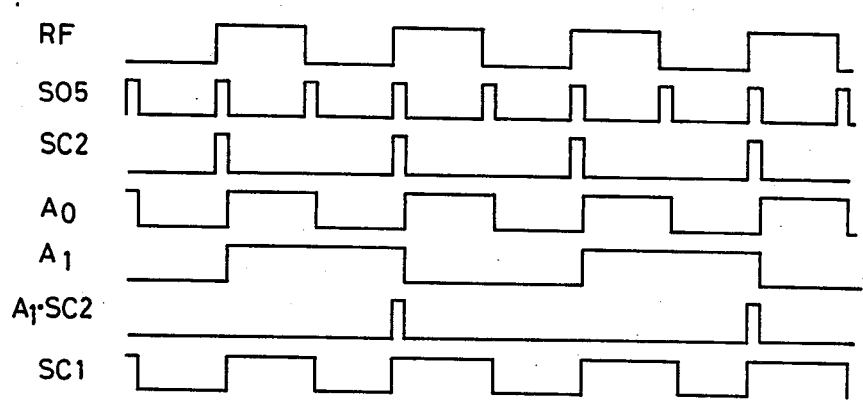
FIG. 8 is a timing chart for explaining the operation of a circuit for sampling an error signal for a frame period by means of the circuit shown in FIGS. 5 and 6.
Figure 9:
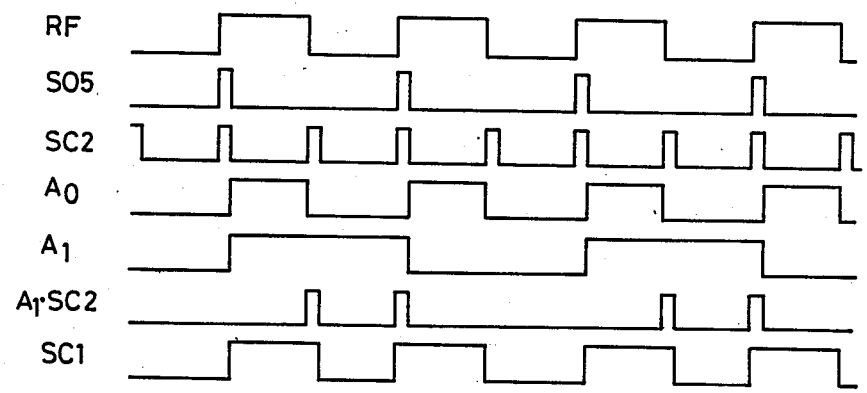
FIG. 9 is a timing chart for explaining the operation of a circuit for sampling an error signal for a field period by means of the circuit shown in FIG. 5.

FIG. 6 is a block diagram showing an example of a detailed circuit structure of the timing pulse generator 3. FIG. 7 is a timing chart for explaining the timing for selection of the selection signal SC3. FIGS. 8 and 9 are timing charts for explaining the timing for supplying the 2-bit ($A_0$, $A_1$) control signal to the reference signal generator 2 as well as the selection signals SC1 and SC2. Particularly, FIG. 8 is a timing chart in the case of sampling of an error signal for a frame period and FIG. 9 is a timing chart in the case of sampling of an error signal for a field period.

First, referring to FIGS. 6, 7 and 8, the operation of the timing pulse generator 3 in the case of sampling of an error signal for a frame period will be described.

In the case of sampling of an error signal for a frame period, the signal supplied from a field/frame terminal 16 is made to fall to a low level. For this purpose, a fourth switch 12 is turned to the "L" side in response to a low level signal supplied from the field/frame terminal 16. A fifth switch 13 is tuned to the "H" side in response to a signal from the field/frame terminal 16 which is inverted to a high level by an inverter 14.

An RF pulse (a pulse for head selection) applied from an RF signal input terminal 17 is supplied to one input terminal of an exclusive OR gate 18 as well as to an edge detecting circuit 19. The edge detecting circuit 19 is a kind of differentiating circuit, which detects edges of rise and fall of the RF pulse and provides a pulse signal in synchronism with the detection of an edge. The output of the edge detecting circuit 19 is shaped in a waveform shaping circuit 20 to be provided in the waveform shown as $\overline{SC3}$ in FIG. 7. This waveform SC3 is inverted by an inverter 21 to be supplied to the third switch 10 as the selection signal SC3 shown in FIG. 7.

The signal SC3 provided from the waveform shaping circuit 20 is supplied to the other input terminal of the exclusive OR gate 18 through the fourth switch 12 turned to the "L" side. Accordingly, the output of the exclusive OR gate 18 becomes an exclusive or of the RF pulse and the signal $\overline{SC3}$, as shown as $A_0$ in FIG. 8. This output signal $A_0$ and a signal $A_1$ obtained by ½ frequency division in a ½ frequency divider 23 are supplied as the 2-bit control signal to the reference signal generator 2 (shown in FIG. 5).

Now, the selection signals SC1 and SC2 will be described. The output $\overline{SC3}$ of the waveform shaping circuit 20 and the RF pulse are supplied to an AND gate 25 where a logical product is calculated. The output of the AND gate 25 is supplied as a signal RF.$\overline{SC3}$. This signal RF.$\overline{SC3}$ is supplied as the selection signal SC2 (shown in FIG. 8) to the second switch 9 through the fifth switch 13 turned to the "H" side.

The selection signal SC1 is formed in the below described manner. A logical product of the signal SC2 and the signal $A_1$ is obtained in an AND gate 27, which provides an output signal $A_1$.SC2 as shown in FIG. 8. Furthermore, a logical sum of the signal $A_1$.SC2 and the signal $A_0$ is obtained in an OR gate 28, which provides an output signal SC1 to the first switch 7.

Thus, the signals $A_0$, $A_1$, SC1, SC2 and SC3 provided from the timing pulse generator 3 are determined when an error signal is sampled for a frame period.

On the contrary, in the case of sampling of an error signal for a field period, it is only necessary to turn to a high level signal supplied from the field/frame terminal 16 of the timing pulse generator 3. In this case, the fourth switch 12 and the fifth switch 13 shown in FIG. 6 are tuned to the "H" side and to the "L" side, respectively, contrary to the drawing. Accordingly, the signal $A_0$ constituting the control signal is formed by an exclusive or of the signal S05 (the same signal as the signal RF.$\overline{SC3}$ as shown in FIG. 9) supplied from the fourth switch 12 and the RF pulse, while the other signal $A_1$ constituting the control signal is an output of ½ frequency division thereof. The selection signal SC2 becomes the signal SC2 shown in FIG. 9, equal to the output signal $\overline{SC3}$ of the waveform shaping circuit 20. The signal SC1 becomes, as shown in FIG. 9, a signal having different timing from the timing in the sampling for a frame period.

FIG. 10 is a timing chart showing waveforms of the respective portions shown in FIG. 5 in the sampling of an error signal for a frame period. Referring to FIG. 5 and 10, a total operation of the circuit of this embodiment shown in FIG. 5 will be described.

The third switch 10 is controlled by the selection signal SC3 to be brought into the ON state except in the infinitesimal time "t" after the start of scanning of the tracks by the reproducing heads. The output of the third switch 10 is held in a pre-hold circuit 11 so as to be an uninterrupted signal, which is supplied as a capstan phase error signal to a capstan motor rotation control circuit (not shown).

The second switch 9 is controlled by the selection signal SC2 having the high level only in the infinitesimal time "t" after the start of scanning of the tracks for a frame period, so that the second switch 9 is tuned on only for the infinitesimal time "t" after the start of the scanning. The output of the second switch 9 is sampled and held in a hold circuit 30 so that a signal SH shown in FIG. 10 is obtained. The output SH provided from the hold circuit 30 is supplied to a low-pass filter 31, through which only a fundamental wave component is separated to be supplied as a signal LP shown in FIG. 10. The signal LP is compared with a threshold level $\theta$ in a comparator 32 provided in the next stage, so that an output CO is obtained from the comparator 32.

On the other hand, the capstan rotation detecting pulse FG generated by the capstan motor is supplied directly to one input terminal of a sixth switch 34 as well as to the other terminal of the sixth switch 34 through a 1/n frequency division circuit 35.

The 1/n frequency division circuit 35 is a variable 1/n frequency division circuit, which functions only at the time of reproduction at an odd-number multiple speed, to apply frequency division according to the multiple speed. For example, at the time of reproduction at a speed three times as much the variable frequency division circuit 35 functions as a ⅓ frequency division circuit. To this frequency division circuit 35, a search signal is applied and based on the search signal, a frequency division ratio of the frequency division circuit 35 is determined.

The search signal is also supplied to the sixth switch 34 as a selection signal. Accordingly, the sixth switch 34 is turned to the "H" side at the time of reproduction at a multiple speed and turned to the "L" side at the time of normal reproduction. Consequently, the rotation detecting pulse FG from the sixth switch 34 is supplied to a counting terminal of a counter circuit 37 as a reference pulse representing a tape speed.

To a reset terminal of the counter circuit 37, an output RE (shown in FIG. 10) from the reset pulse generator 38 is supplied through an OR gate 39. The reset pulse generator 38 is a circuit for generating a reset pulse RE based on the above described output signal CO of the comparator 32. More specifically, in synchronism with the rise of the output CO of the comparator 32, this generator 38 generates a reset pulse RE slightly delayed from the rise.

Accordingly, the counter circuit 37 counts the rotation detecting pulses or the frequency divided pulses thereof during one cycle of reset pulses RE. In other words, a wavelength of the fundamental wave of the error signal sampled during the infinitesimal time "t" after the start of scanning of the tracks is measured based on the rotation detecting pulses or the frequency divided pulses thereof.

An output CT of the counter circuit 37 has a sawtooth waveform having different heights depending on the count value, as shown in FIG. 10. This output CT of the counter circuit 37 is supplied to the first decoder 41 and the second decoder 42. The first decoder 41 provides a high level when the count value obtained as the output CT of the counter circuit 37 is 3M or more. The second decoder 42 provides a high level when the count value obtained as the output CT of the counter circuit 37 is 6M or more.

As described previously concerning the principle of the present invention, the output CT of the counter circuit 37 is; 4M if a tape with track patterns recorded in the standard play recording mode is correctly reproduced; 2M if a tape with track patterns recorded in the long play recording mode is correctly reproduced; 4M if a tape with track patterns recorded in the standard play recording mode is reproduced erroneously at the long play speed; and infinity if a tape with track patterns recorded in the long play recording mode is reproduced erroneously at the standard play speed. Accordingly, if a tape with track patterns recorded in the standard play recording mode is reproduced, the output DC1 of the first decoder 41 is at the high level and the output DC2 of the second decoder 42 is at the low level. If a tape with track patterns recorded in the long play recording mode is reproduced, the output DC1 of the first decoder 41 is at the low level and the output DC2 of the second decoder 42 is also at the low level, or alternatively, both the output DC1 and the output DC2 are at the high level. Accordingly, based on these outputs DC1 and DC2, the tape speed can be determined in the below described manner.

The output DC1 of the first decoder 41 is supplied to a D terminal of a D-flip-flop 43. The D-flip-flop 43 operates according to the rise of the output CO of the comparator 32 as the clock input. In consequence, if with the high level of the comparator output CO, the count output CT exceeds 3M and the decoder output DC1 attains the high level, the output DFF of the D-flip-flop 43 is inverted to the high level.

In this case, since the output DC2 of the second decoder 42 is at the low level, an output RFF of an RS flip-flop 44 is at the low level and an output $\overline{RFF}$ inverted by the inverter 45 is at the high level. Accordingly, an output DT of an AND gate 46 is at the high level if a tape with a signal recorded in the standard play recording mode is reproduced.

On the contrary, if a tape with a signal recorded in the long play recording mode is reproduced, the decoder outputs DC1 and DC2 both are at the low level for example. As a result, the output DFF of the D-flip-flop 43 is at the low level and the inverted output $\overline{RFF}$ of the RS flip-flop 44 is at the high level, and the output DT of the AND gate 46 is at the low level. If the output DC1 of the first decoder 41 and the output DC2 of the second decoder 42 are both at the high level, the output DFF of the D-flip flop 43 is at the high level, the inverted output $\overline{RFF}$ of the RS flip-flop 44 is at the low level and the output DT of the AND gate 46 is at the low level.

Since the RS flip-flop 44 is reset by the output RF of the reset pulse generator 38, it follows that the RS flip-flop 44 is made to reset for a cycle of a fundamental wave of the output of sample-and-hold operation.

The counter 37 is also reset when the output DC2 of the second decoder 42 attains at the high level, and thus the counter circuit 37 newly starts counting.

With the above described structure, it can be understood that the high level of the output DT of the AND gate 46 signifies that the video tape includes a signal recorded in the standard play recording mode and the low level of the output DT signifies that the video tape includes a signal recorded in the long play recording mode. Accordingly, if a speed selection circuit (not shown) of the capstan motor is controlled dependently on the high level or the low level of the output DT, an appropriate tape speed for reproduction can be automatically selected.

Also in the case of sampling of an error signal for a field period, the circuit shown in FIG. 5 operates in the same manner. In this case, the timing for supply of the output signals from the respective portions is slightly different from that in the case of sampling of an error signal for a frame period. Therefore, waveforms in the sampling for a field period are shown in FIG. 11 and a detailed description of the operation in FIG. 5 in this case is omitted.

In the sampling for a field period, if the recording mode is the long play recording mode, the output CT of the counter circuit 37 is always 2M as shown in the above mentioned Table 3. Accordingly, in the sampling for a field period, such circuits as the second decoder 42, the RS flip-flop 44, the inverter 45 and the AND gate 46 which serve to determine that the output CT of the counter circuit 37 is infinity (for example, more than 6M) may be omitted from the circuit structure shown in FIG. 5.

Although an example of an 8 mm VTR was described in the foregoing, the present invention is not limited thereto; the present invention can be applied to any signal reproducing apparatus containing a magnetic recording medium in which tracking control is performed by a pilot signal system.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A tape speed determining apparatus for a video signal recording/reproducing apparatus, operable at a plurality of operating speeds, using a helical scanning system in which a video signal including a plurality of fields recorded on a video tape in a slanted manner is reproduced by means of a rotating head system in which a plurality of reproducing heads which are switched by a reproducing head selection pulse are mounted on a rotating body, said video tape being recorded with a signal that is intended to be reproduced at one of said plurality of operating speeds, said recording/reproducing apparatus using a pilot signal system wherein a plurality of pilot signals recorded with said video signal in an overlapping manner are reproduced and wherein reference signals are supplied with predetermined timing, said tape speed determining apparatus comprising:

timing pulse generator means for deriving timing pulses in response to said reproducing head selection pulse, including means for generating timing pulses that last for an infinitesimal period of time, and delay means for delaying by said period of time selection of reference signals from among said reference signals;

error signal detecting means for detecting, during said infinitesimal period of time, an error signal generated by comparison of the levels of two beat frequencies of said pilot signals, said error signal being sampled by said timing pulses and converted to a pulsed waveform representative of amplitudes of a sequence of said error signals the polarity of which is inverted for alternate fields;

low pass filter means for deriving from said pulsed waveform a fundamental wave; and means for determining from the frequency and waveform of said fundamental wave whether an operating speed at which said fundamental wave is produced is the intended reproduction speed of said video signal and for providing a signal indicative of said determination.

2. A tape speed determining apparatus in accordance with claim 1, wherein
   said error signal detecting means comprises:

sampling timing output means controlled by said timing pulses for providing a sampling timing output for detecting said error signal; and sample-and-hold means for sampling and holding said error signal in response to an output of said sampling timing output means.

3. A tape speed determining apparatus in accordance with claim 2, wherein
said delay means delays uniformly the timing for selection of all of said reference signals.

4. A tape speed determining apparatus in accordance with claim 2, wherein
the number of said reference signals and the frequency of each reference signal are equal to the number of said pilot signals and to the frequency of each pilot signal and if said pilot signals are represented as $F_1$, $F_2$, $F_3$ and $F_4$, said reference signals are represented as $f_1$, $f_2$, $f_3$ and $f_4$; and
said delay means selectively delays specified reference signals out of said reference signals supplied for a predetermined field.

5. A tape speed determining apparatus in accordance with claim 4, wherein
said selectively delayed specified reference signals are the reference signals $f_1$ and $f_3$.

6. A tape speed determining apparatus in accordance with claim 4, wherein
said selectively delayed specified reference signals are the reference signals $f_2$ and $f_4$.

7. A tape speed determining apparatus in accordance with claim 1, wherein
said determining means comprises a counter for counting a number of capstan rotation detecting pulses provided as a function representing a travelling speed of said video tape, whereby said determination is made based on a count value of said counter.

* * * * *

UNITED STATES PATENT AND TRADEMARK OFFICE
CERTIFICATE OF CORRECTION

PATENT NO. : 4,682,247
DATED : July 21, 1987
INVENTOR(S) : NOBUHIDE DOUTSUBO

It is certified that error appears in the above-identified patent and that said Letters Patent is hereby corrected as shown below:

On the cover page, Item [19], change "DOUTSBO" to --- DOUTSUBO ---.

Signed and Sealed this

First Day of December, 1987

Attest:

DONALD J. QUIGG

Attesting Officer

Commissioner of Patents and Trademarks